(12) United States Patent
Frucht (10) Patent No.: US 11,608,194 B2
(45) Date of Patent: Mar. 21, 2023

(54) METHOD AND SYSTEM FOR DETECTING, POSITIONING AND CAPTURING AN INTRUDER IN-FLIGHT USING A LASER DETECTION AND RANGING DEVICE (71) Applicant: Yaacov Frucht, Kibutz Ein Hamifratz (IL)

(72) Inventor: Yaacov Frucht, Kibutz Ein Hamifratz (IL)

( * ) Notice: Subject to any disclaimer, the term of this patent is extended or adjusted under 35 U.S.C. 154(b) by 920 days.

(21) Appl. No.: 16/341,171

(22) PCT Filed: Oct. 3, 2017

(86) PCT No.: PCT/IL2017/051122
§ 371 (c)(1),
(2) Date: Apr. 11, 2019

(87) PCT Pub. No.: WO2018/069921
PCT Pub. Date: Apr. 19, 2018

(65) Prior Publication Data
US 2020/0180784 A1 Jun. 11, 2020

Related U.S. Application Data (60) Provisional application No. 62/406,425, filed on Oct. 11, 2016.

(51) Int. Cl.
*B64F 3/00* (2006.01)
*H04N 5/232* (2006.01)
*G01S 17/86* (2020.01)
*G01S 17/88* (2006.01)
*G08G 5/00* (2006.01)
(Continued)

(52) U.S. Cl.
CPC .............. *B64F 3/00* (2013.01); *G01S 17/86* (2020.01); *G01S 17/88* (2013.01); *G06V 10/147* (2022.01);
(Continued)

(58) Field of Classification Search
CPC ....... B64F 3/00; H04N 5/23299; G01S 17/86; G01S 17/88; G06V 20/20; G06V 10/147;
(Continued)

(56) References Cited

U.S. PATENT DOCUMENTS 6,804,607 B1 10/2004 Wood
8,439,301 B1 5/2013 Lussier et al.
(Continued)

FOREIGN PATENT DOCUMENTS

GB 2016/03913 4/2016

OTHER PUBLICATIONS

Extended European Search Report of EP 17859571.6 dated Sep. 7, 2020.
(Continued)

*Primary Examiner* — Michael D Lang
(74) *Attorney, Agent, or Firm* — Reches Patents (57) ABSTRACT

A method and a system for detecting and positioning an intruder within a specified volume are provided herein. The method may include the following steps: periodically scanning using a laser detection and ranging (LADAR) device directing a laser beam, within the specified volume; collecting reflections of the laser beam arriving from objects within the volume; converting the reflections to LADAR signal indicative of spatiotemporal presence of objects within the volume; applying signal processing algorithms to the LADAR signals, to determine a presence of an intruder and respective orientation parameters, based on predefined criteria; directing a camera based on the orientation parameters associated with the intruder for continuously capturing images of the intruder; and analyzing the images by a computer processor and instructing the camera to track the intruder based on the analysis, to yield real-time tracking parameters of the intruder.

18 Claims, 6 Drawing Sheets

(51) Int. Cl.
  *G06V 10/147* (2022.01)
  *G06V 20/20* (2022.01)
  *F16M 11/12* (2006.01)
  *F16M 11/18* (2006.01)

(52) U.S. Cl.
  CPC ............ *G06V 20/20* (2022.01); *G08G 5/0056* (2013.01); *G08G 5/0069* (2013.01); *H04N 5/23299* (2018.08); *F16M 11/123* (2013.01); *F16M 11/18* (2013.01); *G06V 2201/07* (2022.01)

(58) Field of Classification Search
  CPC ............ G06V 2201/07; G08G 5/0056; G08G 5/0069; F16M 11/123; F16M 11/18
  See application file for complete search history.

(56) References Cited

U.S. PATENT DOCUMENTS

| | | | |
|---|---|---|---|
| 10,408,936 B2* | 9/2019 | Van Voorst | ........ G05D 1/0088 |
| 2010/0042269 A1 | 2/2010 | Kokkeby et al. | |
| 2010/0053330 A1 | 3/2010 | Hellickson et al. | |
| 2013/0208948 A1 | 8/2013 | Berkovich et al. | |
| 2016/0189548 A1 | 6/2016 | Thurling et al. | |
| 2016/0240087 A1 | 8/2016 | Kube et al. | |

OTHER PUBLICATIONS

International Search Report of PCT Application No. PCT/IL2017/051122, dated Mar. 7, 2018.

* cited by examiner

METHOD AND SYSTEM FOR DETECTING, POSITIONING AND CAPTURING AN INTRUDER IN-FLIGHT USING A LASER DETECTION AND RANGING DEVICE

CROSS-REFERENCE TO RELATED APPLICATIONS

This application is a National Phase Application of PCT International Application No. PCT/IL2017/051122, International Filing Date Oct. 3, 2017, entitled: "METHOD AND SYSTEM FOR DETECTING, POSITIONING AND CAPTURING AN INTRUDER IN-FLIGHT USING A LASER DETECTION AND RANGING DEVICE", published on Apr. 19, 2018, under publication No. WO 2018/069921, which claims the benefit of U.S. provisional patent application No. 62/406,425, filed on Oct. 11, 2016, all of which are hereby incorporated by reference in their entirety

FIELD OF THE INVENTION

The present invention relates generally to a system for detecting, tracking and capturing an intruder in-flight, and more particularly, to such a system employing a laser detection and ranging device.

BACKGROUND OF THE INVENTION

Prior to setting forth the background of the invention, it may be helpful to set forth definitions of certain terms that will be used hereinafter.

The term "laser detection and ranging" (LADAR) or "light detection and ranging" (LiDAR) is referred herein as a device that measures distance to a target by illuminating that target with light such as a pulsed laser light, and measuring the reflected pulses with a sensor. Differences in laser return times and wavelengths can then be used to make digital representations of the target.

While LADAR devices become more available for commercial uses, they still suffer from precision and latency issues that renders them unsuitable on their own for surveillance and homeland security purposes.

The term "unmanned aerial vehicle (UAV), commonly known as a drone is referred herein to an aircraft without a human pilot aboard. UAVs are a component of an unmanned aircraft system (UAS); which include a UAV, a ground-based controller, and a system of communications between the two. The flight of UAVs may operate with various degrees of autonomy: either under remote control by a human operator, or fully or intermittently autonomously, by onboard computers.

With small UAVs and drones becoming more and more popular, controlling them and maintaining a so-called drone-free space becomes more and more challenging.

Therefore, it would be advantageous to find a way by which the features of LADAR may be effectively harnessed for detecting and tracking applications. It would further be advantageous to find a way by which the undesired so-called intruding drones and other entities may be safely captured without any explosives or ballistic projectiles directed at them.

SUMMARY OF THE INVENTION

Some embodiments of the present invention provide a method and a system for detecting, positioning and capturing an intruder in-flight within a specified volume. The invention may include the following steps: periodically scanning using a laser detection and ranging (LADAR) device directing a laser beam, within the specified volume; collecting at a detection and tracking unit reflections of the laser beam arriving from objects within the specified volume; converting the reflections to LADAR signal indicative of spatiotemporal presence of objects within the specified volume; applying signal processing algorithms to the LADAR signals, to determine a presence of an intruder and respective orientation parameters, based on predefined criteria; directing a camera based on the orientation parameters associated with the intruder for continuously capturing images of the intruder; analyzing the images by a computer processor and instructing the camera to track the intruder based on the analysis, to yield real-time tracking parameters of the intruder; transmitting to a capturing control unit the real-time tracking parameters of the intruder from said detection and tracking unit; and, generating at the capturing control unit defeat instructions and transmitting said defeat instructions to at least one capturing device, the or each capturing device being configured to receive said defeat instructions and capture said intruder in-flight.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1A:
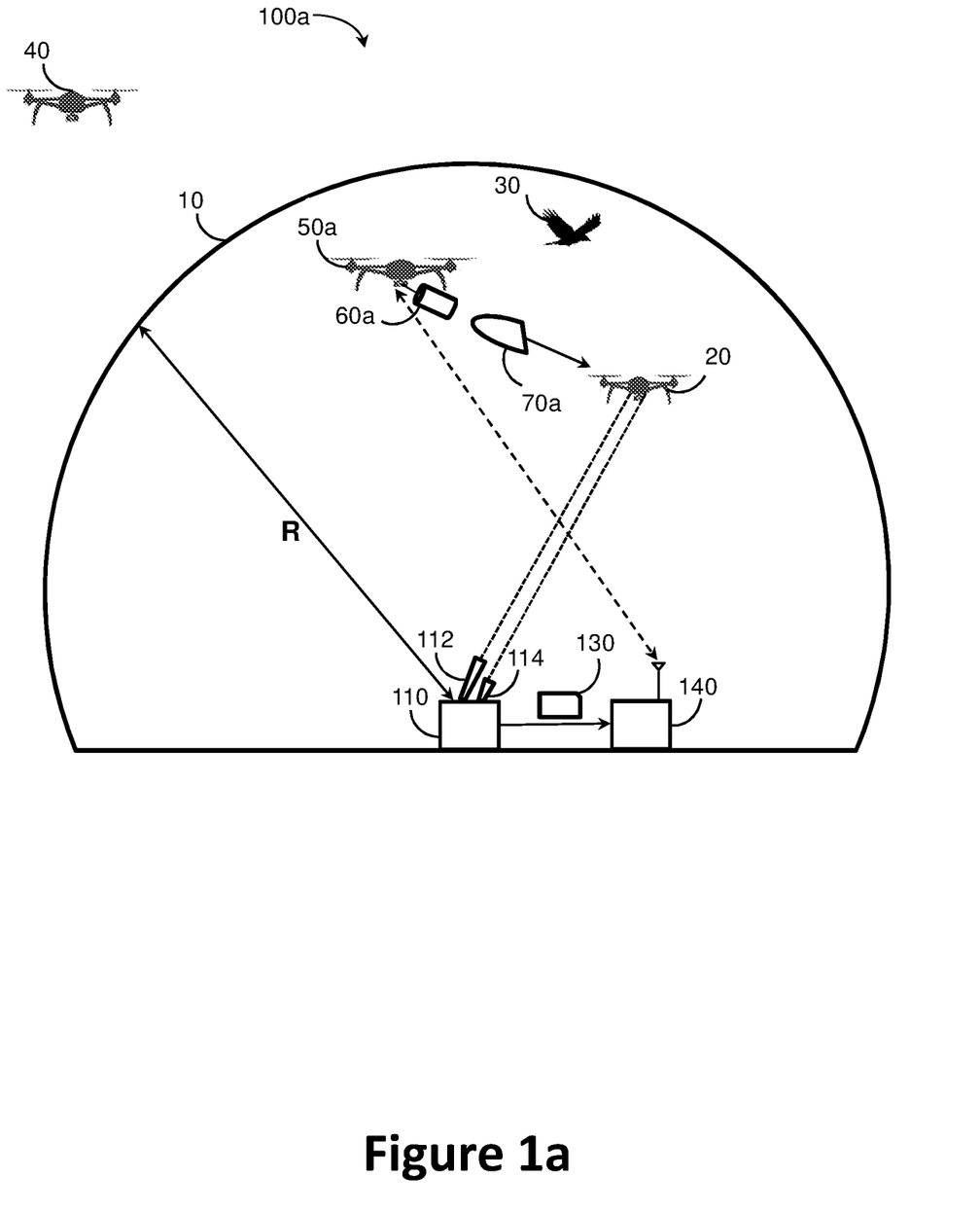
FIG. 1a is a block diagram illustrating non-limiting exemplary architecture of a system in accordance with embodiments of the present invention.
Figure 1B:
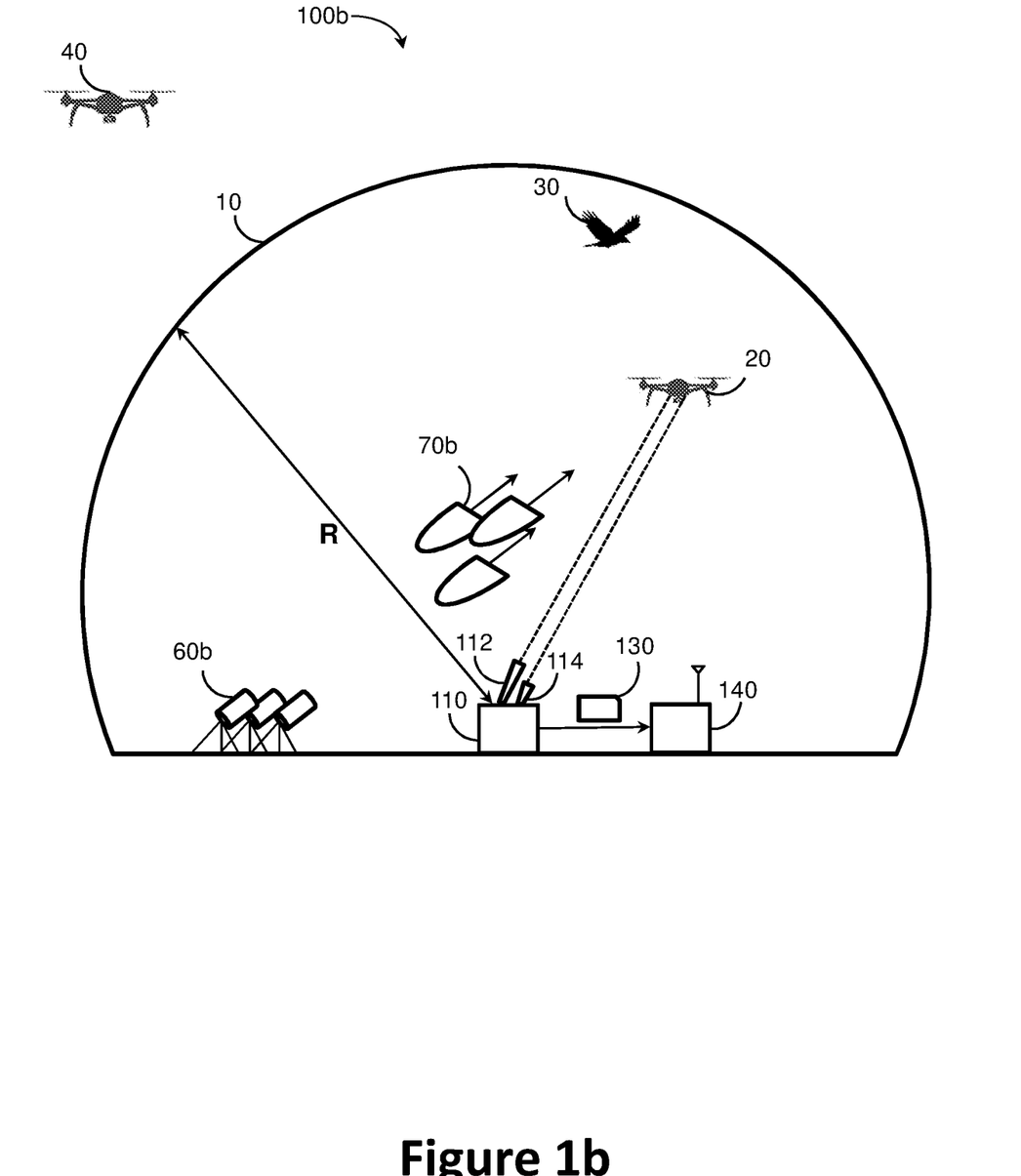
FIG. 1b is a block diagram illustrating non-limiting exemplary architecture of a system in accordance with embodiments of the present invention.
Figure 1C:
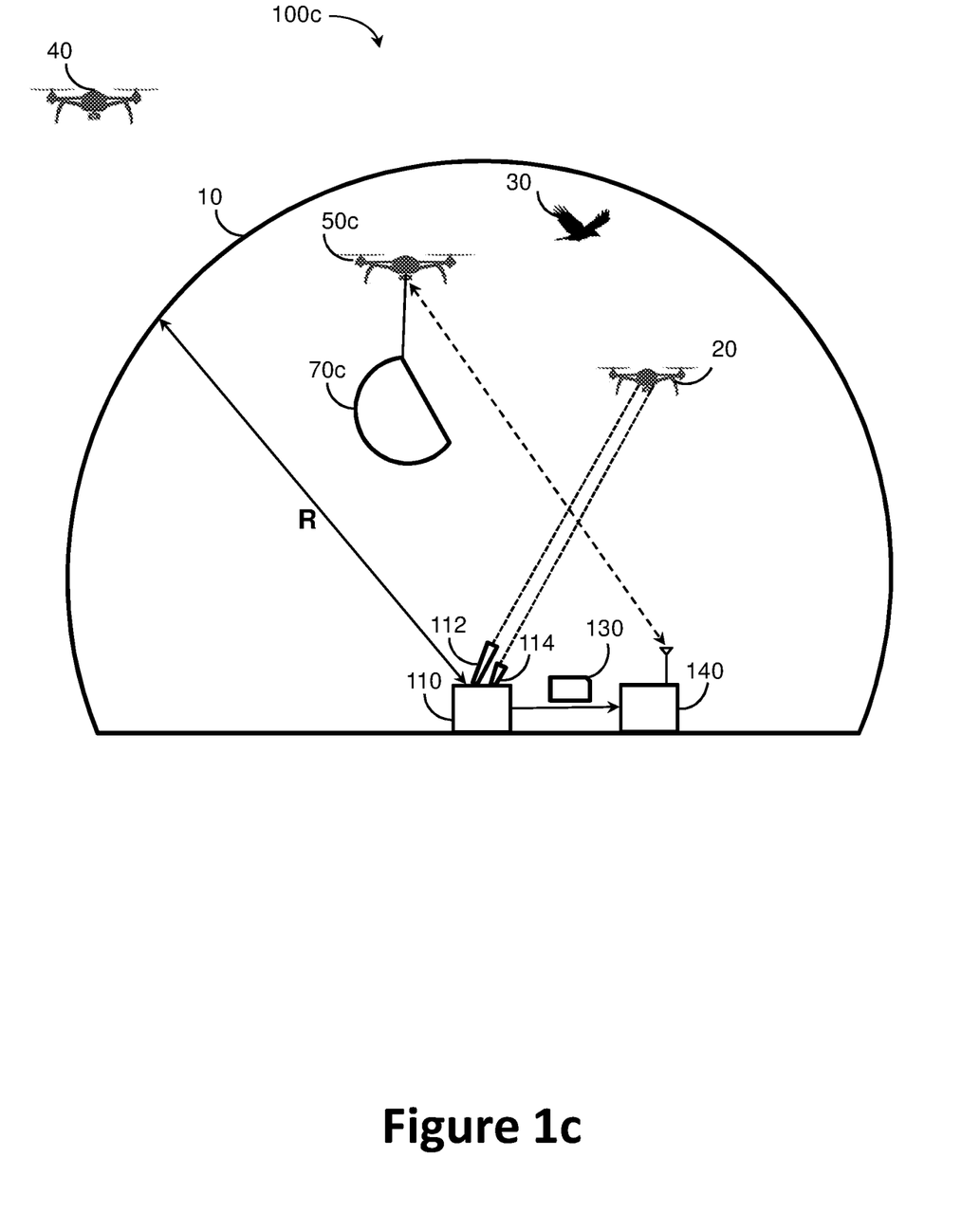
FIG. 1c is a block diagram illustrating non-limiting exemplary architecture of a system in accordance with embodiments of the present invention.

FIGS. 1a, 1b and 1c each depict a block diagram illustrating a non-limiting exemplary architecture of a system in accordance with an embodiment of the present invention. Systems 100a, 100b and 100c each show a laser detection and ranging (LADAR) device 112 (or any general laser detector) configured for detecting and positioning an intruder within a specified volume 10 (possibly but not limited to a volume having a radius R). The volume can be defined based on structures in the environment. LADAR device 112 may include at least one laser transmitter and at least one laser sensor (not shown here).

In operation, LADAR device 112 may be configured to: periodically scan via a laser beam, a specified volume 10 and collect at a detection and tracking unit 110 reflections of the laser beam arriving from objects such as object 30 and object 20 within volume 10. Detection and tracking unit 110 may be further configured to convert the reflections into LADAR signal indicative of spatiotemporal presence of objects such as object 30 and 20 within volume 10. Detection and tracking unit 110 may be configured to ignore any reflections coming from objects outside volume 10, this may be achieved by calibrating LADAR device 112 for a maximal range set to radius R.

In accordance with some embodiments of the present invention, detection and tracking unit 110 may be physically or wirelessly connected to LADAR device 112 and may be configured to apply signal processing algorithms to the LADAR signals, to determine a presence of an intruder 20 and respective orientation parameters, based on predefined criteria or an un-harmful object 30. It should be noted that objects beyond volume 10, such as object 40, are deemed irrelevant due to their location but may become relevant as soon as they enter volume 10.

The purpose of LADAR device 112 is to illuminate incoming object threats but other objects such as buildings, which a priori, are not incoming threats but are considered as environmental noise. Evidently, environmental noise is not relevant and is therefore filtered out. It is the task of the detection and tracking unit to filter out environmental noise by running a dedicated filtering computer program, for execution by a computer, which computer program is stored in a non-transitory computer readable medium. It may thus be said that the filtering program embodied in the computer-readable medium is dedicated to detect a relevant object 20, having the level of danger of being a threat, out of many objects penetrating into the hemispheric volume scanned by the LADAR device 112. In accordance with some embodiments of the present invention an algorithm implemented by the aforementioned computer readable code may use those parameters to calculate the threshold. It is done in an adaptive mode and this enable filtering out of moving vegetation and other changes in the neighborhood.

In accordance with some embodiments of the present invention, systems 100a, 100b and 100c may further include a camera 114 configured to receive the orientation parameters associated with intruder 30 and continuously capture images of intruder 20, wherein detection and tracking unit 110 may be configured to receive the images, and instruct camera 114 to track intruder 20 based on an analysis of the images, to yield real-time tracking parameters 130 of intruder 20.

According to some embodiments of the present invention, detection and tracking unit 110 may be configured to apply at least one de-noising filter to the LADAR signals prior to determining the presence of intruder 30.

According to some embodiments of the present invention, camera 114 may be a gimballed camera and wherein said system further comprises a driver configured to mechanically control pan-tilt-zoom (PTZ) parameters of said camera based on said orientation parameters.

According to some embodiments of the present invention, predefined criteria for determining a presence of an intruder in specific orientation parameters comprise a level of an integral of two of the LADAR signals measured in different times for the specific orientation parameters.

According to some embodiments of the present invention, analysis of the images include analyzing a mobility and an appearance of the intruder.

According to some embodiments of the present invention, wherein the mobility comprises at least one of: speed, acceleration, and vector of advancement, and wherein the appearance comprises at least one of: shape, color, and size.

According to some embodiments of the present invention, orientation parameters comprise an orientation a line of sight of the LADAR whenever the line of sight intersects an objected determined to be an intruder.

According to some embodiments of the present invention, real-time tracking parameters are at least one order of magnitude more precise than the orientation parameters.

According to some embodiments of the present invention, comprising a display, wherein the detection and tracking unit 110 is configured to present on the display images of the intruder captured continuously while being tracked.

FIG. 1A is a block diagram illustrating non-limiting exemplary architecture of a system in accordance with embodiments of the present invention. System 100a shows a combined system that includes a detection and tracking unit 110 configured for detecting and positioning, via LADAR device 112, an intruder 20 within a specified volume that may be also defined based on structures within a specified volume 10 having a radius R. Detection and tracking unit 110 may be configured in cooperative operation to first detect and then track any intruder within volume 10 having a radius R, based on predefined criteria.

In accordance with some embodiments of the present invention, real-time position 130 within volume 10 of the intruder 20 is recorded and transferred in real time to a capturing control unit 140 which processes the threats and then transmits instructions to one or more capturing platforms 50a associated with a capturing device 60a.

In operation, capturing control unit 140 may provide data relating to either intruder 20 or capturing platform 50a to a human user (not shown here) and received in response, instructions that may override the instructions automatically generated by capturing control unit 140 in response to receiving real-time position 130 within volume 10 of the intruder 20, from Detection and tracking unit 110. Additionally, capturing control unit 140 may assume full control over detection and tracking unit 110 and instruct its operation towards acquiring more data of intruder 20.

In accordance with some embodiments of the present invention, detection and tracking unit 110 may continue to track intruder 20 as a locked-on object to allow further level of danger evaluation or else, locks-off from that object if so commanded by the capturing control unit 140, either by command of the human operator or by autonomous operation and automatic command of capturing control unit 140. When the status of intruder 20 is recognized as being a target to be defeated, a "defeat target" command is given to capturing platform 50*a* to start a defeat operation.

The Capturing Platform

In accordance with some embodiments of the present invention, capturing platform 50*a* may be an Autonomous Airborne Vehicle (AAV) able to hover such as or similar to a quadcopter or a helicopter. The airborne mission of capturing platform 50*a* may be autonomous from take-off to return to base but may be overridden by the human operator along the various phases of aerial operation. This means that control of the flight of capturing platform 50*a* may have two modes that are interchangeable: either be autonomous by default, or, under command of the human operator, to be piloted under his or her command until he or she decides to revert to the autonomous mode.

Once airborne, the aerial mission of capturing platform 50*a* may include: approach of intruder 20, followed by intruder inspection and reconnaissance, intruder capture, and return to base of the capturing platform 50*a*.

In accordance with some embodiments of the present invention, capturing platform 50*a* may include at least one airborne camera, an airborne processor, and a capturing device implemented, for example, as projectile launcher 60*a*, the three of which may be coupled in bidirectional communication with a controller. The controller may include a flight and navigation unit, and an airborne transceiver.

In accordance with some embodiments of the present invention, one or more airborne camera(s) is/are required at least for a final target inspection phase, for the visual inspection of the intruder 20, now classified as threat, before a final decision is taken to declare that the level of threat is that intruder 20 needs to be defeated. Further advantage of the airborne camera(s) may be taken during the various phases of the airborne mission of capturing platform 50*a*, and especially so during the target capture phase.

In accordance with some embodiments of the present invention, the airborne processor may process image frames derived by the airborne camera(s) which may be received via a controller, and may derive final identification and level of danger classification data of intruder 20, for example during the target reconnaissance phase of the mission. The projectile launcher 60*a*, which fires target capture netting 70*a* (which remains connected to capturing platform 50*a* via a thread), may be operated autonomously by the controller, or under the autonomous control of capturing control unit 140, or by intervention of the operator.

In accordance with some embodiments of the present invention, with the controller, the flight and navigation unit commands the airborne travel of the capturing platform 50*a* unless overridden by autonomous commands from capturing control unit 140, or overridden by the operator. The airborne transceiver may provide for bidirectional communication with the transceiver of capturing control unit 140.

In accordance with some embodiments of the present invention, during the target reconnaissance phase of the mission, reconnaissance may include the operation of identification means, or may include other means that may contribute to reduce the time needed for the classification of the level of danger as either an intruder to be defeated or maybe just as an inoffensive object. For example, the identification of friend-or-foe (F.O.F.) may be derived automatically, or a classification of level of threat may be obtained by an image processing computer program running on the airborne processor. The level of threat may be transmitted, together with the image frames received from the airborne camera(s), via the airborne transmitter, to capturing control unit 140 and to the operator.

In accordance with some embodiments of the present invention, in turn, the user may accept or override the level of threat classification derived by the image processing computer program, or may command repetition of the target reconnaissance phase while detection and tracking unit 110 is configured to continue to track the threat. However, in case of doubt while the threat reaches a predetermined engagement threshold ENG of distance into the area A to be protected, regardless of the level of threat classification, the threat may be classified as a target to be captured and defeated.

Capture Mechanism

In accordance with some embodiments of the present invention, target capture netting 70*a* may be fired from projectile launcher 60*a* when capturing platform 50*a* is disposed at an appropriate distance and attitude with regards to the the intruder 20 as described hereinbelow. Upon command of the capturing control unit 140, the target capture netting 70*a* is fired to catch and incapacitate target 20. After firing target capture netting 70*a*, it is still secured to capturing platform 50*a* so it may be dragged to a specified area.

In accordance with some embodiments of the present invention, projectile launcher 60*a* may be fixedly attached directly to the belly, or bottom portion of capturing platform 50*a*. Further, target capture netting 70*a* may be stored in a folded and contained disposition within projectile launcher 60*a* prior to deployment.

In accordance with some embodiments of the present invention, at least one targeting system may be coupled to the capturing platform 50*a*. The targeting system may comprise a primary sensor operable to determine a trajectory and speed of intruder 20 and may further comprise a secondary sensor operable to determine and calculate local environmental conditions. It will be appreciated that local weather conditions such as windspeed, rainfall and snowfall may be critical to the accuracy of the targeting system. The targeting system may be physically or wirelessly connected to projectile launcher 60*a* and may issue positioning instructions to the navigation unit of capturing platform 50*a*. The targeting system may control, based on an assessed trajectory and speed of intruder 20 and the local environmental conditions, when to fire projectile launcher 60*a*. The targeting system may further control the power with which target capture netting 70*a* is fired from projectile launcher 60*a*. It will be appreciated that the targeting system may assess a trajectory and speed of intruder 20 using any appropriate sensing means, including infrared cameras, radar, sonar and lidar. It will also be appreciated that the targeting system may be fully autonomous, or may be monitored by an operator and remotely controlled by capture control unit 140 over a wireless communications link.

In accordance with some embodiments of the present invention, projectile launcher 60*a* may be gimballed and rotate about a fixing on the underside of capturing platform 50*a* to achieve any viable orientation. Such rotation may be facilitated by any appropriate connection mechanism. It will be appreciated that viable orientations may be restricted to those in a plane beneath capturing platform 50*a*. The rotation of projectile launcher 60*a* may be constrained or precisely controlled by a motor. The motor may be physically or wirelessly connected to the targeting system which may issue orientation instructions, such as yaw and roll commands, to the motor to vary the orientation of projectile launcher 60*a*. The detection and tracking unit 110 and the targeting system may communicate wirelessly to exchange intruder 20 data. The exchanged data may be used to improve the accuracy of commands given to the motor when varying orientation of projectile launcher 60*a*. The exchanged data may further be used to improve the accuracy of the targeting system, or to improve the accuracy and efficiency of positioning commands issued to the navigation unit of capturing platform 50*a*.

Engagement and Defeat Procedure

In accordance with some embodiments of the present invention, when, or even before intruder 20 is classified as a target, the processing apparatus, the targeting system, the detection and tracking unit 110 and the operator cooperate in association to acquire data about the size, flight characteristics and weight of the threat to best select capturing platform 50*a* capable to defeat the intruder, which capturing platform 50*a* may be selected out of a squadron including various types of capturing platforms. However, for the sake of ease of description, reference is made to one model of capturing platforms.

In accordance with some embodiments of the present invention, prior to take-off, or at the time the take-off command is given, the capturing control unit 140 provides spatial position data of the threat, as tracked by detection and tracking unit 110, to the navigation unit via the transceiver and the airborne transceiver. Alternatively, data is provided to an airborne capturing platform 50*a*. Alternatively, capturing platform 50*a* is already in flight when a target is detected and tracked.

In accordance with some embodiments of the present invention, to reach the target faster, the capturing platform 50*a* may be assisted for take-off by jettisonable rockets, also known as JATO. The navigation unit may guide capturing platform 50*a* towards intruder 20 where intruder 20 reconnaissance procedure may be started to provide close range image frames of the target. Such frames may be derived by the airborne camera and be transmitted to the airborne processor for image processing, and delivery of the derived level of danger results to the processing apparatus, and for the operator, to the display of the capturing control unit 50*a*. The final decision if to command defeat intruder 20, or to abort the mission, may be taken either automatically by computer program(s) or by the operator.

If the mission is aborted, the capturing platform 50*a* returns to base under guidance of the navigation unit. Else, according to command, the defeat procedure is started. The capturing platform 50*a* is guided automatically to trail the target and gradually reduce the distance thereto by commands from the navigation unit. When at an appropriate distance, for example within 100 m of intruder 20, the targeting system may be activated and projectile launcher 60*a* may be orientated to target intruder 20. Thereafter projectile launcher 60*a* may be fired successively until intruder 20 is incapacitated by target capture netting 70*a*. The defeat procedure may be repeated in case of failure of the first capture attempt. Alternatively, the operator may override the automatic defeat procedure and use image frames taken by the one or more airborne camera(s) to manually guide the positioning of capturing platform 50*a* and the orientation of projectile launcher 60*a* to capture intruder 20.

FIG. 1*b* is a block diagram illustrating non-limiting exemplary architecture of a system in accordance with embodiments of the present invention. System 100*b* shows a combined system that includes a detection and tracking unit 110 configured for detecting and positioning an intruder 20 within a specified volume 10 having a radius R. Detection and tracking unit 110 may be configured in cooperative operation to first detect and then track any intruder within volume 10 having a radius R, based on predefined criteria.

In accordance with some embodiments of the present invention, real-time position 130 within volme 10 of the intruder 20 is recorded and transferred in real time to a capturing control unit 140 which processes the threats and then transmits instructions to the targeting system of one or more capturing platforms 50*c*.

In operation, capturing control unit 140 may provide data relating to intruder 20 to a human user (not shown here) and received in response, instructions that may override the instructions automatically generated by capturing control unit 140 or projectile launcher 60*b* targeting system in response to receiving real-time position 130 within volume 10 of the intruder 20, from detection and tracking unit 110. Additionally, capturing control unit 140 may assume full control over detection and tracking unit 110 and instruct their operation towards acquiring more data of intruder 20.

In accordance with some embodiments of the present invention, detection and tracking unit 110 may continue to track intruder 20 as a locked-on object to allow further level of danger evaluation or else, locks-off from that object if so commanded by the capturing control unit 140, either by command of the human operator or by autonomous operation and automatic command of capturing control unit 140. When the status of intruder 20 is recognized as being a target to be defeated, a "defeat target" command is given to projectile launchers 60*b* to start a defeat operation.

Capture Mechanism

In accordance with some embodiments of the present invention, target capture netting 70*b* may be fired from projectile launcher 60*b* when capturing control unit 140 issues a defeat command Target capture netting 70*b* may be stored in a folded and contained disposition within projectile launcher 60*b* prior to deployment.

In accordance with some embodiments of the present invention, at least one targeting system may be physically or wirelessly connected to projectile launchers 60*b*. The targeting system may comprise a primary sensor operable to determine a trajectory and speed of intruder 20 and may further comprise a secondary sensor operable to determine and calculate local environmental conditions. It will be appreciated that local weather conditions such as windspeed, rainfall and snowfall may be critical to the accuracy of the targeting system. The targeting system may control, based on an assessed trajectory and speed of intruder 20 and the local environmental conditions, when to fire projectile launchers 60*b*. The targeting system may further control the power with which target capture netting 70*b* is fired from projectile launchers 60*b*. It will be appreciated that the targeting system may assess a trajectory and speed of intruder 20 using any appropriate sensing means, including infrared cameras, radar, sonar and lidar. It will also be appreciated that the targeting system may be fully autonomous, or may be monitored by an operator and remotely controlled by capture control unit 140 over a wireless communications link.

In accordance with some embodiments of the present invention, projectile launchers 60b may each comprise a ground stand, such as a tripod, and may be gimballed to tilt and rotate about these stands to achieve any viable orientation. Tilting and rotation may be facilitated by any appropriate connection mechanism between the projectile launchers 60b and stand, such as a ball and socket joint. It will be appreciated that viable orientations may be restricted to those in a plane above ground level. It will also be appreciated that the projectile launchers may be portable and may be relocated within volume 10. The tilting and rotation of projectile launchers 60b may be constrained or precisely controlled by a motor. The motor may be physically or wirelessly connected to the targeting system which may issue orientation instructions, such as yaw and roll commands, to the motor to vary the orientation of projectile launcher 60b. The detection and tracking unit 110 and the targeting system may communicate wirelessly to exchange intruder 20 data. The exchanged data may be used to improve the accuracy of commands given to the motor when varying orientation of projectile launcher 60b. The exchanged data may further be used to improve the accuracy of the targeting system.

Engagement and Defeat Procedure

In accordance with some embodiments of the present invention, when, or even before intruder 20 is classified as a target, the processing apparatus, the targeting system, the tracking unit 120 and the operator cooperate in association to acquire data about the size, flight characteristics and weight of the threat to best select projectile launcher 60b capable to defeat the intruder. It will however be appreciated that multiple projectile launchers 60b may be used to incapacitate a single intruder 20. Where multiple projectile launchers 60b are used, the orientations of each launcher may be arranged such that target capture netting 70b is dispersed in a spread pattern. The spread pattern may be such that target capture netting 60b is dispersed to cover a larger total area about the intruder 20 so as to increase speed and reliability of incapacitation.

In accordance with some embodiments of the present invention, when a defeat procedure is started, projectile launchers 60b are immediately orientated to target intruder 20 in accordance with data from the targeting system and the detection and tracking unit 110. Thereafter projectile launchers 60b may be fired individually or in combination until intruder 20 is incapacitated by target capture netting 70b. The defeat procedure may be repeated in case of failure of the first capture attempt. Alternatively, the operator may override the automatic defeat procedure and use data from the targeting system and the detection and tracking unit 110 to manually guide the orientation of projectile launchers 60b to capture intruder 20.

FIG. 1c is a block diagram illustrating non-limiting exemplary architecture of a system in accordance with embodiments of the present invention. System 100c shows a combined system that includes a detection and tracking unit 110 configured for detecting and positioning an intruder 20 within a specified volume 10 having a radius R. Detection and tracking unit 110 may be configured in cooperative operation to first detect and then track any intruder within volume 10 having a radius R, based on predefined criteria.

In accordance with some embodiments of the present invention, real-time position 130 within volume 10 of the intruder 20 is recorded and transferred in real time to a capturing control unit 140 which processes the threats and then transmits instructions to one or more capturing platforms 50c associated with a capturing device 70c.

In operation, capturing control unit 140 may provide data relating to either intruder 20 or capturing platform 50c to a human user (not shown here) and received in response, instructions that may override the instructions automatically generated by capturing control unit 140 in response to receiving real-time position 130 within volume 10 of the intruder 20, from detection and tracking unit 110. Additionally, capturing control unit 140 may assume full control over detection and tracking unit 110 and instruct its operation towards acquiring more data of intruder 20.

In accordance with some embodiments of the present invention, detection and tracking unit 110 may continue to track intruder 20 as a locked-on object to allow further level of danger evaluation or else, locks-off from that object if so commanded by the capturing control unit 140, either by command of the human operator or by autonomous operation and automatic command of capturing control unit 140. When the status of intruder 20 is recognized as being a target to be defeated, a "defeat target" command is given to capturing platform 50c to start a defeat operation.

The Capturing Platform

In accordance with some embodiments of the present invention, capturing platform 50c may be an Autonomous Airborne Vehicle (AAV) able to hover such as or similar to a quadcopter or a helicopter. The airborne mission of capturing platform 50c may be autonomous from take-off to return to base but may be overridden by the human operator along the various phases of aerial operation. This means that control of the flight of capturing platform 50c may have two modes that are interchangeable: either be autonomous by default, or, under command of the human operator, to be piloted under his or her command until he or she decides to revert to the autonomous mode.

Once airborne, the aerial mission of capturing platform 50c may include: approach of intruder 20, followed by intruder inspection and reconnaissance, intruder capture, intruder disposal at a site determined a priori, and return to base of the capturing platform 50c.

In accordance with some embodiments of the present invention, capturing platform 50c may include at least one airborne camera, an airborne processor, and a capturing device 70c implemented, for example, as target capture netting, the three of which may be coupled in bidirectional communication with a controller. The controller may include a flight and navigation unit, and an airborne transceiver.

In accordance with some embodiments of the present invention, one or more airborne camera(s) is/are required at least for a final target inspection phase, for the visual inspection of the intruder 20, now classified as threat, before a final decision is taken to declare that the level of threat is that intruder 20 needs to be defeated. Further advantage of the airborne camera(s) may be taken during the various phases of the airborne mission of capturing platform 50c, and especially so during the target capture phase.

In accordance with some embodiments of the present invention, the airborne processor may process image frames derived by the airborne camera(s) which may be received via a controller, and may derive final identification and level of danger classification data of intruder 20, for example during the target reconnaissance phase of the mission. The target capture netting 70c may be operated autonomously by the controller, or under the autonomous control of capturing control unit 140, or by intervention of the operator.

In accordance with some embodiments of the present invention, with the controller, the flight and navigation unit commands the airborne travel of the capturing platform 50c unless overridden by autonomous commands from capturing control unit 140, or overridden by the operator. The airborne transceiver may provide for bidirectional communication with the transceiver of capturing control unit 140.

In accordance with some embodiments of the present invention, during the target reconnaissance phase of the mission, reconnaissance may include the operation of identification means, or may include other means that may contribute to reduce the time needed for the classification of the level of danger as either an intruder to be defeated or maybe just as an inoffensive object. For example, the identification if friend-or-foe (F.O.F.) may be derived automatically, or a classification of level of threat may be obtained by an image processing computer program running on the airborne processor. The level of threat may be transmitted, together with the image frames received from the airborne camera(s), via the airborne transmitter, to capturing control unit 140 and to the operator.

In accordance with some embodiments of the present invention, in turn, the user may accept or override the level of threat classification derived by the image processing computer program, or may command repetition of the target reconnaissance phase while detection and tracking unit 110 is configured to continue to track the threat. However, in case of doubt while the threat reaches a predetermined engagement threshold ENG of distance into the area A to be protected, regardless of the level of threat classification, the threat may be classified as a target to be captured and defeated.

Capture Mechanism

In accordance with some embodiments of the present invention, target capture netting 70c may be operated when the capturing platform 50c is disposed in appropriate distance and attitude vis-א-vis the intruder 20 as described hereinbelow. Upon command of the capturing control unit 140, the capture netting is flown to catch the target 20.

In accordance with some embodiments of the present invention, target capture netting 70c which may be attached to the belly, or bottom portion of capturing platform 50c, in folded disposition prior to deployment.

In accordance with some embodiments of the present invention, at least one beam may be coupled lengthwise along the bottom portion of the capturing platform 50c flying to catch intruder 20 in a direction of flight X of a Cartesian set of coordinates. The beam may be coupled to a beam pivotal hinge, such as a ball-and-socket joint for example, which is attached to a closed but releasable beam hook fixedly supported by the bottom portion of capturing platform 50c. The beam pivotal hinge may be disposed at a downstream end portion of the beam at, or downstream of the center of gravity (CG) of the capturing platform 50c.

In accordance with some embodiments of the present invention, a net frame may be disposed between the beam and the bottom portion, and may be coupled thereto upstream of the center of gravity CG, by a closed but releasable frame hook. A frame hinge may couple a front end of the at least one beam to the net frame, upstream of the center of gravity CG. A net of meshes draped over the net frame and suitable to catch the intruder 20.

In accordance with some embodiments of the present invention, capturing platform 50c after the opening of the closed frame hook which causes the beam to deploy and pivot by gravity about the beam hinge and the frame to pivot by gravity about the frame hinge. At this stage, the target capture netting is disposed in the deployed state. It is noted that the beam pivotal hinge prevents the transfer of moments from the net frame and the net of meshes to the interceptor by being a ball-and-socket type of joint.

In an alternative configuration, the target capture netting may be configured without a releasable frame hook, whereby the target capture netting deploys after lift-off of the capturing platform 50c and remains open in the deployed state during the flight toward intruder 20.

Engagement and Defeat Procedure

In accordance with some embodiments of the present invention, when, or even before intruder 20 is classified as a target, the processing apparatus, the detection and tracking unit 110 and the operator cooperate in association to acquire data about the size, flight characteristics and weight of the threat to best select capturing platform 50c capable to defeat the intruder, which capturing platform 50c may be selected out of a squadron including various types of capturing platforms. However, for the sake of ease of description, reference is made to one model of capturing platforms.

In accordance with some embodiments of the present invention, prior to take-off, or at the time the take-off command is given, the capturing control unit 140 provides spatial position data of the threat, as tracked by the detection and tracking unit 110, to the navigation unit via the transceiver and the airborne transceiver. Alternatively, data is provided to an airborne capturing platform 50c.

In accordance with some embodiments of the present invention, to reach the target faster, the capturing platform 50c may be assisted for take-off by jettisonable rockets, also known as JATO. The navigation unit may guide capturing platform 50c towards intruder 20 where intruder 20 reconnaissance procedure may be started to provide close range image frames of the target. Such frames may be derived by the airborne camera and be transmitted to the airborne processor for image processing, and delivery of the derived level of danger results to the processing apparatus, and for the operator, to the display of the capturing control unit 50c. The final decision if to command defeat intruder 20, or to abort the mission, may be taken either automatically by computer program(s) or by the operator.

If the mission is aborted, the capturing platform 50c returns to base under guidance of the navigation unit. Else, according to command, the defeat procedure is started. The capturing platform 50c is guided automatically to trail the target and gradually reduce the distance thereto to up to about 10 m by commands from the navigation unit. At that distance, the frame may be deployed if not flown open, and capturing platform 50c may close in on the target with the net of meshes at the altitude of the target, until the last one is captured in the net.

The defeat procedure maneuver may be repeated in case of failure of the first capture attempt. Alternatively, the operator may override the automatic defeat procedure and use image frames taken by the one or more airborne camera(s) to manually guide capturing platform 50c and capture intruder 20 into the net of meshes. Upon capture success, capturing platform 50c may fly, under the guidance of the navigation unit, to a disposal area DA, to release the target capture netting by opening the releasable beam hook. Thereby, the capture netting with intruder 20 in the net of meshes may be safely landed in the disposal area DA. The location of the disposal area DA may be preloaded in the navigation unit or altered during flight or after intruder 20 capture, by communication from the capturing control unit 140 via the transceiver and the airborne transceiver.

Figure 2:
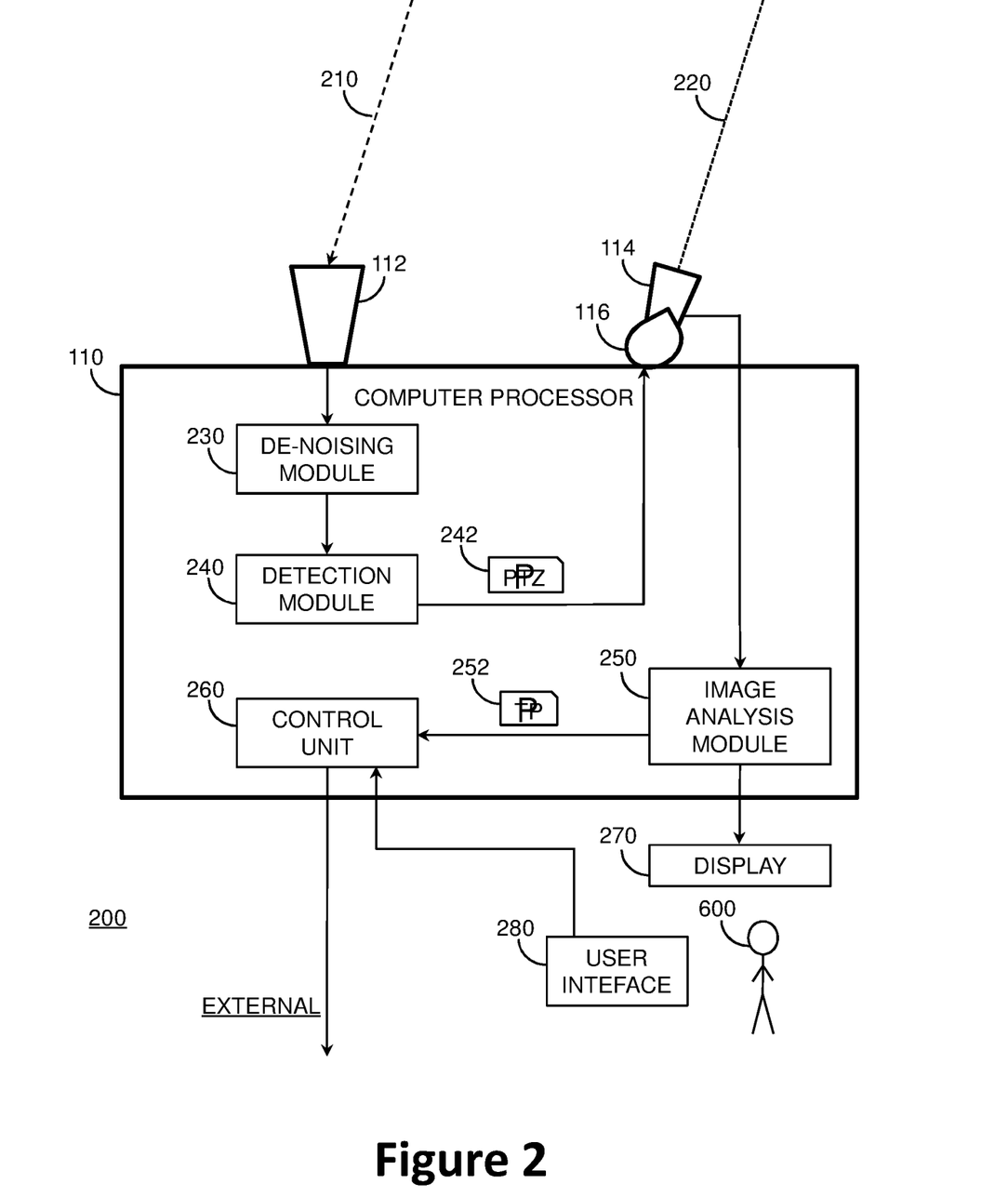
FIG. 2 is a detailed block diagram illustrating a non-limiting exemplary implementation of a system in accordance with embodiments of the present invention.

FIG. 2 is a detailed block diagram illustrating a non-limiting exemplary implementation of a system in accordance with embodiments of the present invention. System 200 shows in more details an exemplary non-limiting implementation of the system in accordance with embodiments of the present invention. Reflections 210 from an object within the volume (not shown here) are received at LADAR device 112 and are converted into respective LADAR signals that are being filtered by de-noising module 230 possibly implemented by detection and tracking unit 110. The filtered signals are then applied to a decision function possibly implemented by detection module 240 where a decision whether the reflections belong to an intruder or not. In the case they are, respective PTZ parameters 242 associated with the direction of the intruder are applied to a driver 116 which is mechanically coupled to camera 114 which is directed accordingly and starts capturing images of the intruder. These images are conveyed to an image analysis module 250, possibly implemented detection and tracking unit 110 or by a human operator, where further recognition and enhancement of the images may be carried out. Tracking parameters 252 are then derived in real time so that camera 114 tracks the intruder in real time and image analysis module 250 keeps tracking the intruder in real time. In addition, signal level are used to correct the distance (distance corrections).

The tracking parameters may be conveyed to a control unit 260 for use by an external entity, such as capturing control unit 140. Additionally, image analysis module 250 may provide enhanced images to be presented over a display 270 to an operator 600 who can then provide his or her input via a user interface 280 to control unit 260. In accordance with some embodiments of the present invention, any time a target is detected, on the next scan the scanning rate is reduced and the resolution is increased for better results.

Figure 3:
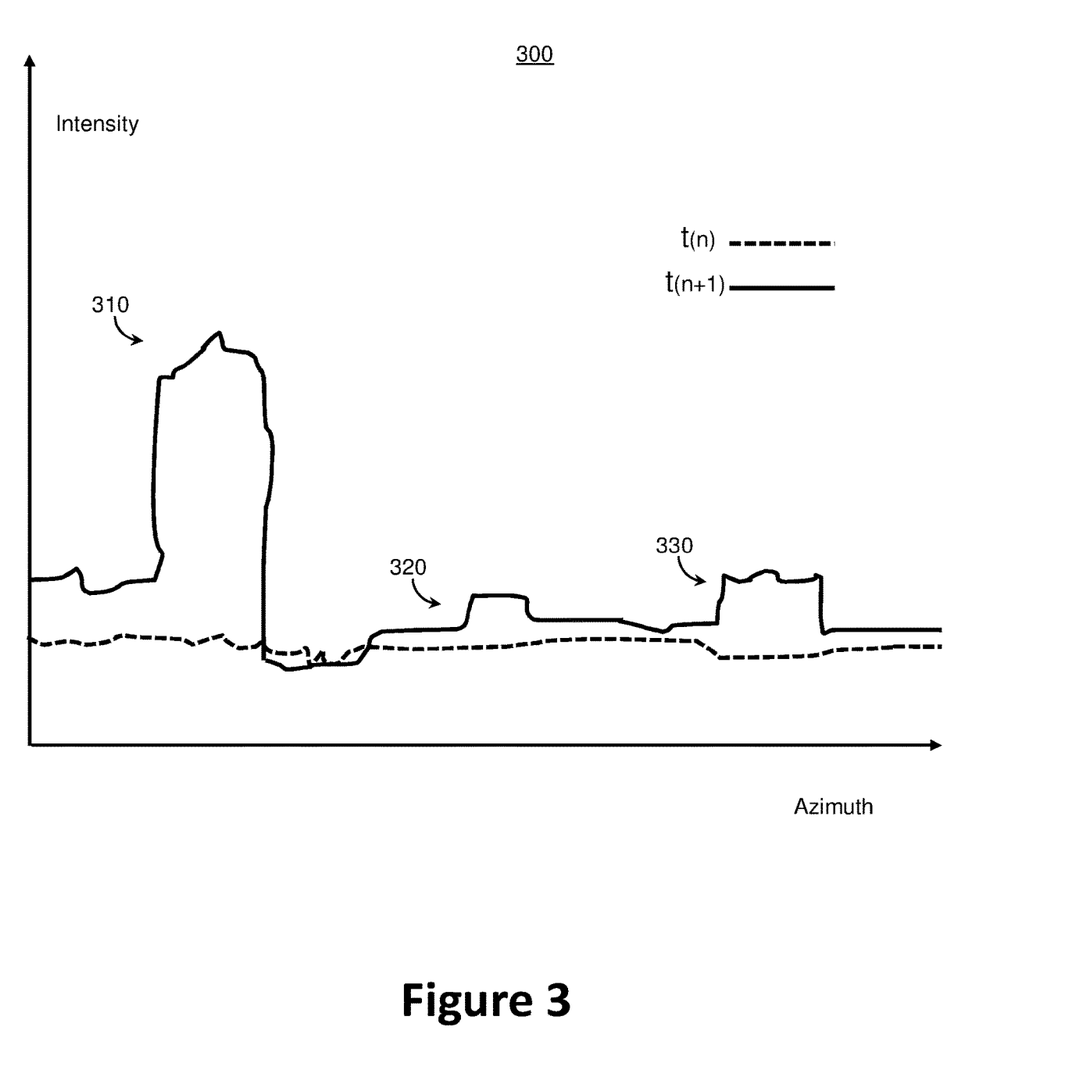
FIG. 3 is a graph diagram illustrating an aspect in accordance with embodiments of the present invention.

FIG. 3 is a graph diagram 300 illustrating an aspect in accordance with embodiments of the present invention. Graph 300 shows LADAR signals intensity vs. spatial location (e.g. azimuth) in two different times. As can be shown in region 310 the difference between the two signals including the height of the step function and the size of the object all indicate it to be an intruder while in regions 320 and 300 the amount of energy differences in in insufficient either because the object is too remote, too small, moves slowly or any other predefined criteria.

Figure 4:
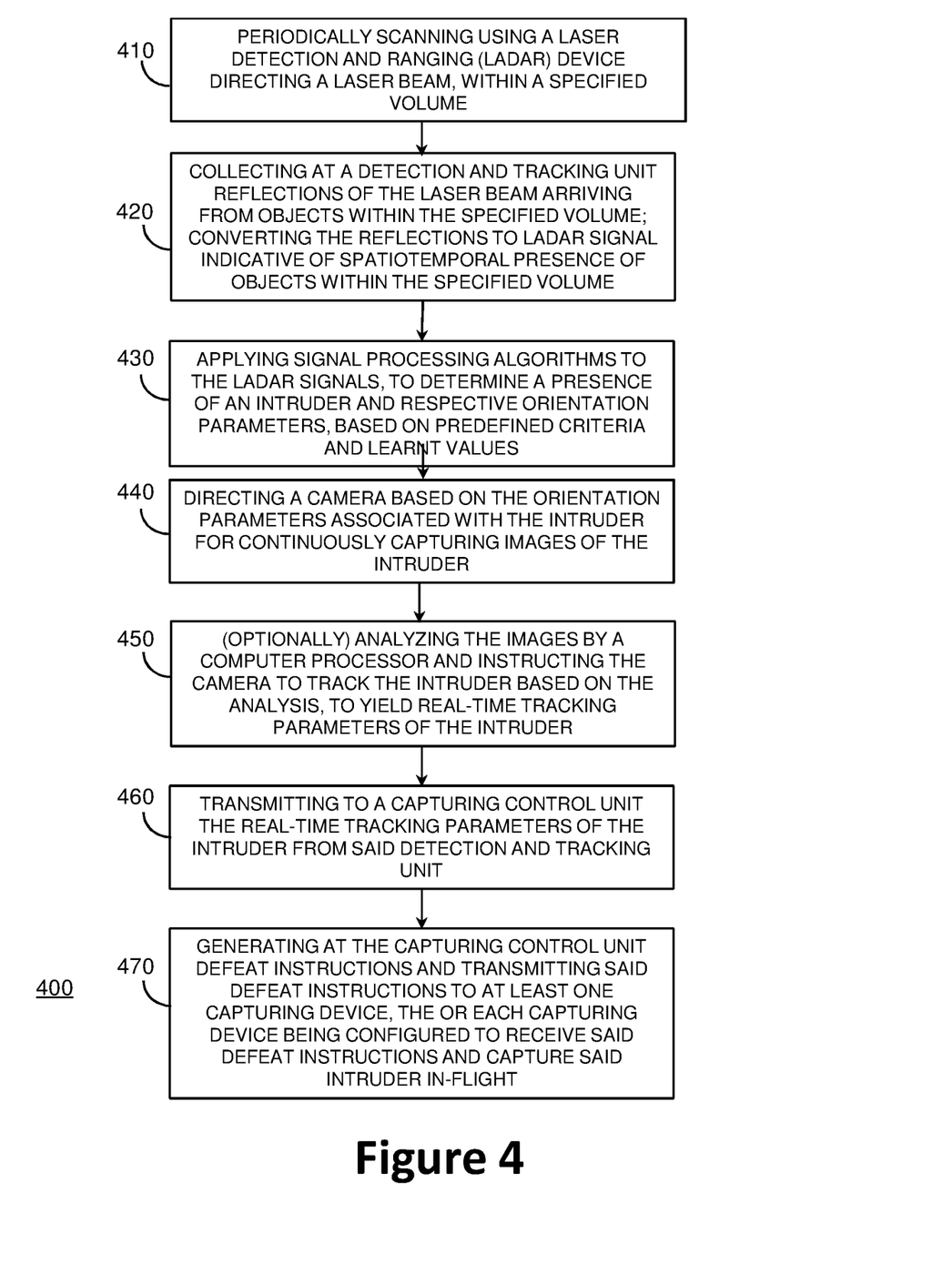
FIG. 4 is a high-level flowchart illustrating a non-limiting exemplary method in accordance with embodiments of the present invention.

FIG. 4 is a high-level flowchart illustrating a non-limiting exemplary method 400 in accordance with embodiments of the present invention. Method 400 of detecting and positioning an intruder within a specified volume may include the following steps: periodically scanning using a laser detection and ranging (LADAR) device directing a laser beam, within the specified volume 410; collecting at a detection and tracking unit reflections of the laser beam arriving from objects within the volume; converting the reflections to LADAR signal indicative of spatiotemporal presence of objects within the volume 420; applying signal processing algorithms to the LADAR signals, to determine a presence of an intruder and respective orientation parameters, based on predefined criteria 430; directing a camera based on the orientation parameters associated with the intruder for continuously capturing images of the intruder 440; analyzing the images by a computer processor and instructing the camera to track the intruder based on the analysis, to yield real-time tracking parameters of the intruder 450; transmitting to a capturing control unit the real-time tracking parameters of the intruder from said detection and tracking unit 460; and, generating at the capturing control unit defeat instructions and transmitting said defeat instructions to at least one capturing device, the or each capturing device being configured to receive said defeat instructions and capture said intruder in-flight 470.

In order to implement method 400 according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, some aspects of the present invention may be embodied as a system, method or computer program product. Accordingly, some aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

I claim:

1. A system for detecting and positioning an intruder within a specified volume, the system comprising:
    a laser detection and ranging (LADAR) device comprising at least one laser transmitter and at least one laser sensor, said LADAR device configured to:
    periodically scan via a laser beam, said specified volume;
    collect reflections of said laser beam arriving from objects within said specified volume;
    convert said reflections to LADAR signal indicative of spatiotemporal presence of objects within said specified volume;
    a computer processor configured to apply signal processing algorithms to said LADAR signals, to determine a presence of an intruder and respective orientation parameters, based on predefined criteria; and
    a camera configured to receive said orientation parameters associated with said intruder and continuously capture images of said intruder,
    wherein said computer processor is configured to receive said images, and instruct said camera to track said intruder based on an analysis of said images, to yield real-time tracking parameters of said intruder,
    wherein said computer processor is configured to transmit said real-time tracking parameters of said intruder to a control unit, the control unit being operable to determine intruder defeat instructions and transmit said defeat instructions to at least one capturing device, and
    wherein each capturing device is configured to receive said defeat instructions and capture said intruder in-flight, and is one or more of:
    a) a capturing platform, the capturing platform being equipped with a projectile launcher operable to fire target capture netting;
    b) a capturing platform, the capturing platform being equipped with target capture netting attached to a bottom portion of the capturing platform; and,
    c) a projectile launcher comprising, the projectile launcher being operable to fire target capture netting.

2. The system according to claim 1, wherein the computer processor is configured to apply at least one de-noising filter to said LADAR signals prior to determining the presence of the intruder.

3. The system according to claim 1, wherein said camera is a gimballed camera and wherein said system further comprises a driver configured to mechanically control pan-tilt-zoom (PTZ) parameters of said camera based on said orientation parameters.

4. The system according to claim 1, wherein said predefined criteria for determining a presence of an intruder in specific orientation parameters comprise a level of an integral of two of the LADAR signals measured in different times for said specific orientation parameters.

5. The system according to claim 1, wherein said analysis of said images include analyzing a mobility and an appearance of said intruder.

6. The system according to claim 5, wherein said mobility comprises at least one of: speed, acceleration, and vector of advancement, and wherein said appearance comprises at least one of: shape, color, and size.

7. The system according to claim 1, wherein said orientation parameters comprise an orientation a line of sight of said LADAR whenever said line of sight intersects an objected determined to be an intruder.

8. The system according to claim 1, wherein the or each capturing platform further comprises a camera configured to provide images of the intruder, wherein the images are used to verify target status of the intruder.

9. The system according to claim 1, further comprising a display, wherein said computer processor is configured to present on said display images of the intruder captured continuously while being tracked.

10. A method of detecting and positioning an intruder within a specified volume, the method comprising:
    periodically scanning using a laser detection and ranging (LADAR) device directing a laser beam, within said specified volume;
    collecting reflections of said laser beam arriving from objects within said volume;
    converting said reflections to LADAR signal indicative of spatiotemporal presence of objects within said volume;
    applying signal processing algorithms to said LADAR signals, to determine a presence of an intruder and respective orientation parameters, based on predefined criteria;
    directing a camera based on said orientation parameters associated with said intruder for continuously capturing images of said intruder;
    analyzing said images by a computer processor and instructing said camera to track said intruder based on the analysis, to yield real-time tracking parameters of said intruder;
    transmitting said real-time tracking parameters of said intruder to a control unit; and,
    generating at the control unit defeat instructions and transmitting said defeat instructions to at least one capturing device, each capturing device being configured to receive said defeat instructions and capture said intruder in-flight, and is one or more of:
    a) a capturing platform, the capturing platform being equipped with a projectile launcher operable to fire target capture netting;

b) a capturing platform, the capturing platform being equipped with target capture netting attached to a bottom portion of the capturing platform; and, c) a projectile launcher comprising a ground stand, the projectile launcher being operable to fire target capture netting.

11. The method according to claim 10, further comprising applying at least one de-noising filter to said LADAR signals prior to determining the presence of the intruder.

12. The method according to claim 10, wherein said camera is a gimballed camera and wherein said method further comprises mechanically controlling pan-tilt-zoom (PTZ) parameters of said camera based on said orientation parameters.

13. The method according to claim 10, wherein said predefined criteria for determining a presence of an intruder in specific orientation parameters comprise a level of an integral of two of the LADAR signals measured in different times for said specific orientation parameters.

14. The method according to claim 10, wherein said analysis of said images include analyzing a mobility and an appearance of said intruder.

15. The method according to claim 14, wherein said mobility comprises at least one of: speed, acceleration, and vector of advancement, and wherein said appearance comprises at least one of: shape, color, and size.

16. The method according to claim 10, wherein said orientation parameters comprise an orientation a line of sight of said LADAR whenever said line of sight intersects an objected determined to be an intruder.

17. The method according to claim 10, wherein the or each capturing platform further comprises a camera configured to provide images of the intruder, wherein the images are used to verify target status of the intruder.

18. The method according to claim 10, further comprising presenting, over a display, images of the intruder captured continuously while being tracked.

* * * * *